United States Patent
Teng et al.

(10) Patent No.: US 8,149,329 B2
(45) Date of Patent: Apr. 3, 2012

(54) IMAGE PROCESSING SYSTEM AND RELATED IMAGE PROCESSING METHOD THEREOF

(75) Inventors: Chin Hua Teng, Hsinchu (TW); Yueh-Hsing Huang, Hsinchu (TW); Jin-Sheng Gong, Hsinchu (TW)

(73) Assignee: Realtek Semiconductor Corp., Hsinchu (TW)

( * ) Notice: Subject to any disclaimer, the term of this patent is extended or adjusted under 35 U.S.C. 154(b) by 1281 days.

(21) Appl. No.: 11/882,043

(22) Filed: Jul. 30, 2007

(65) Prior Publication Data

US 2008/0030627 A1    Feb. 7, 2008

(30) Foreign Application Priority Data

Aug. 3, 2006    (TW) ................ 95128423 A

(51) Int. Cl.
*H04N 7/00* (2011.01)
*H04N 11/00* (2006.01)

(52) U.S. Cl. ........ 348/467; 348/463; 348/464; 348/465; 348/466; 348/468; 348/571

(58) Field of Classification Search .......... 348/463–468, 348/571
See application file for complete search history.

(56) References Cited

U.S. PATENT DOCUMENTS 5,844,623 A * 12/1998 Iwamura .................. 725/70

* cited by examiner

*Primary Examiner* — Hunter Lonsberry
(74) *Attorney, Agent, or Firm* — Muncy, Geissler, Olds & Lowe, PLLC

(57) ABSTRACT

An image processing system, for processing display data and vertical blanking interval data carried by a composite signal, is disclosed. The image process system includes: a video decoder, for decoding the display data to generate corresponding image data; a VBI decoder, for decoding the VBI data to generate corresponding VBI image data; a converter, for converting the VBI image data into color index data; a transmission interface, for transmitting the decoded image data and color index data; and an image processing module, for receiving the image data and the color index data to deinterlace/scale the image data and converting the color index data back into the original VBI image data, mixing the processed image data and the VBI image data such that data to be displayed can be generated.

21 Claims, 5 Drawing Sheets

Instruction rules

| Byte number after SAV/EAV | Rules |
|---|---|
| Byte 1 | Instruction code<br>Byte 1[b7] is an odd parity bit<br>Byte 1[b6;b0]= instruction codes |
| Byte 2~ Byte 3 | Packet length<br>Byte 2 indicates least significant bits of the packet length<br>Byte 3 indicates most significant bits of teh packet length<br>Byte 2[b7] is an odd parity bit of the byte 2[b6;b0]<br>Byte 3[b7] is an odd parity bit of the byte 3[b6;b0]<br>Byte 3[b6:b4]=X(reserved) |
| Byte 4~ Byte (n+4) | Packet body |

Instruction code

| Instruction code | Definition |
|---|---|
| 0-0000001b | VBIOSD frame property instruction |
| 0-0000010b | VBIOSD pixel instruction |
| 1-0000011b | VBIOSD pixel repeating instruction |
| 0-1000000b | Register access instruction |
| 1-0000000b | End instruction<br>This instruction does not have "packet length" |
| 0-0010000b | End instruction<br>This instruction does not have "packet length" |

Fig. 5

IMAGE PROCESSING SYSTEM AND RELATED IMAGE PROCESSING METHOD THEREOF

BACKGROUND OF THE INVENTION

1. Field of the invention

The present invention provides an image processing system and related image processing method thereof, and more particularly, to an image processing system and related image processing method capable of make the VBI image clearer.

2. Description of the Related Art

In the past, the cathode ray tube (CRT) displays are major displays. Because the characteristics of the electronic gun, when a field is completely displayed and a next field is to be displayed, the electronic gun needs time to move from the last scan line to the first scan line. Therefore, the TV signal should have an interval between successive fields to provide enough time to the electronic gun to move back to the first scan line.

The above-mentioned interval between the successive fields is called as a vertical blanking interval. The region for transferring pixel data of the field is called as an active region. In general, the VBI of the TV signal does not have to carry any pixel data of the field. Therefore, the VBI can be utilized to transfer some specific data, such as data of teletexts or close caption. The specific data is so-called VBI data.

Please refer to FIG. 1, which is a diagram of a conventional image processing system 100. As shown in FIG. 1, the receiving module 110 comprises a video decoding unit 111, a VBI decoding unit 112, and an image mixing unit 113. The image decoding unit 111 can decode the received TV signal. For example, the TV signal is often a composite signal, and the image decoding unit 111 can perform the Y/C separation on the fields carried by the TV signal to generate a corresponding RGB signal. On the other hand, the VBI decoding unit 112 can decode the VBI data carried by the VBI of the TV signal to generate the OSD to be displayed (which is also transferred as RGB signals.). And then, the image mixing unit 113 can mix the field data decoded by the image decoding unit 111 with the VBI image data decoded by the VBI decoding unit 112. And then, the mixed image data is transferred to the image de-interlacing unit/image scaling unit 115 through the ITU656 interface 114 to perform the de-interlacing or scaling operations. At last, the processed image data is transferred to the display screen (not shown) to display.

For example, the VBI data can carry the above-mentioned close caption. And the image mixing unit 113 can add the decoded close caption into the decoded field such that a new field can be generated. The image de-interlacing unit/image scaling unit 115 can perform de-interlacing/scaling operation and the de-interlaced data are displayed by the display screen.

SUMMARY OF THE INVENTION

In view of the above-mentioned problems, an object of the invention is to provide an image processing system and related image processing method, to improve the quality of the displayed image.

According to an embodiment of the present invention, an image processing system is disclosed. The image processing system comprises: a receiving module, for receiving a composite signal carrying a first display data and a vertical blanking interval (VBI) data, the receiving module comprising: a video decoding unit, for decoding the first display data to generate a first image data; a VBI data decoding unit, for decoding the VBI data to generate a VBI image data; and a first converting unit, coupled to the VBI decoding unit, for converting the VBI image data into a color index data; a transmission interface, coupled to the receiving module, for transmitting the first image data and the color index data; and an image processing module, coupled to the transmission interface, the image processing module comprises: an image processing unit, for receiving the first image data to generate a second image data; a second converting unit, for receiving the color index data and generating the VBI image data according to the color index data; and an image mixing unit, coupled to the image processing unit and the second converting unit, for mixing the second image data and the VBI image data to generate a second display data.

According to another embodiment of the present invention, an image processing method is disclosed. The image processing method comprises: receiving a composite signal carrying a first display data and a vertical blanking interval (VBI) data; decoding the first display data to generate a first image data; decoding the VBI data to generate a VBI image data; performing a predetermined operation on the first image data to generate a second image data; and mixing the second image data and the VBI image data to generate a second display data.

BRIEF DESCRIPTION OF THE DRAWINGS

FIG. 5 illustrates the rules of the VBI instruction packets according to the present invention.

DETAILED DESCRIPTION OF THE INVENTION

Figure 1:
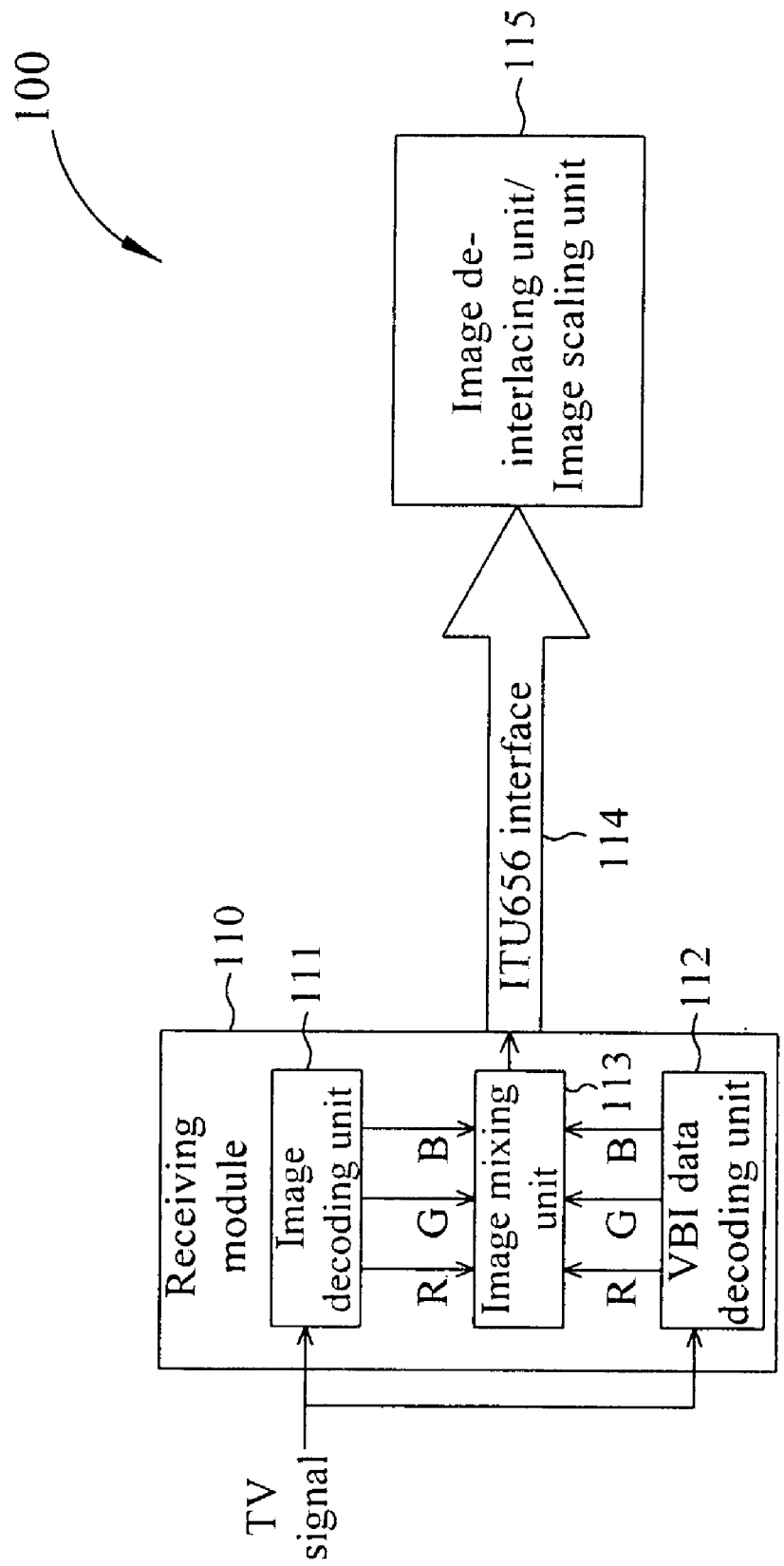
FIG. 1 is a diagram of a conventional image processing system.
Figure 2:
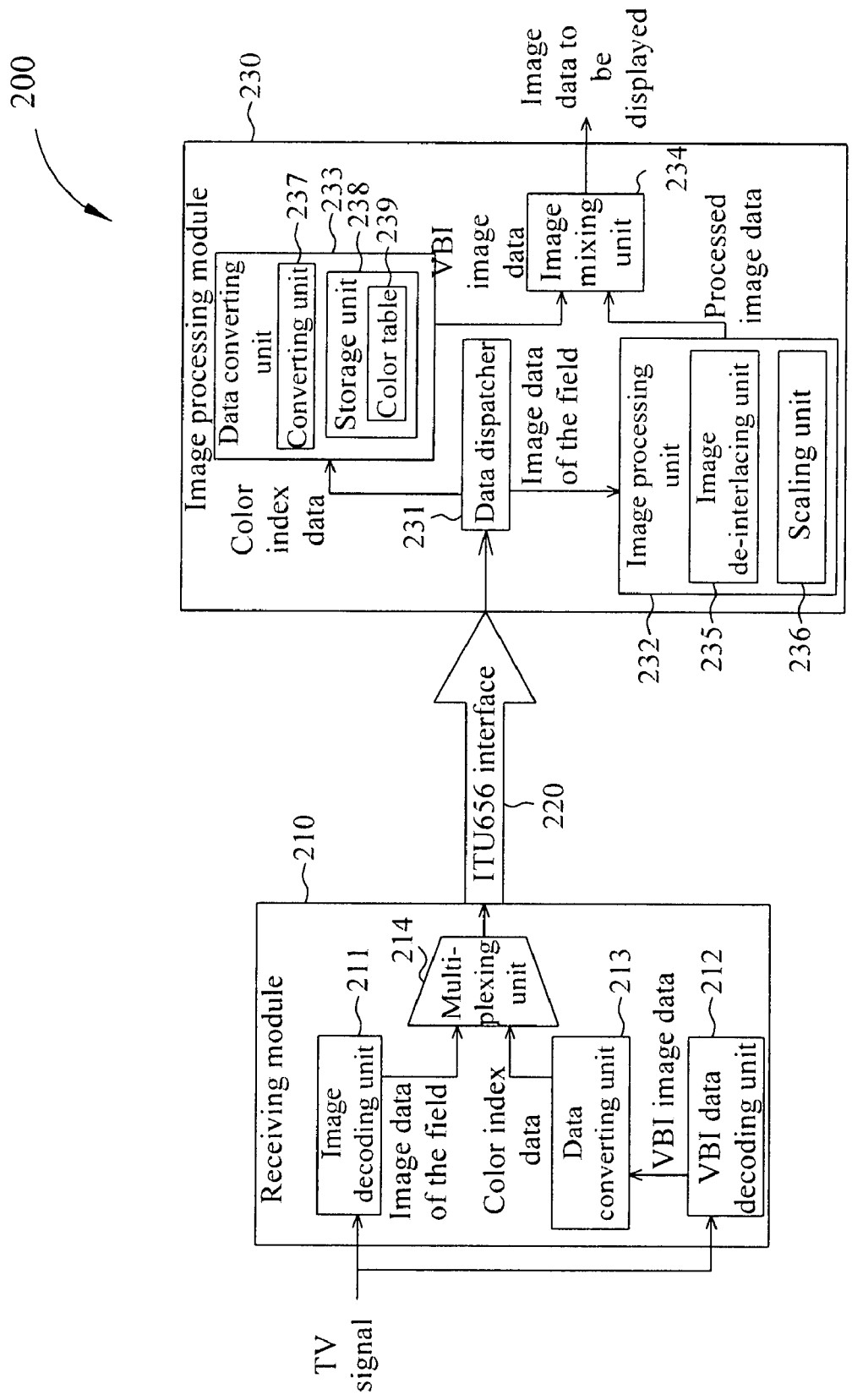
FIG. 2 is a diagram of an image processing system of an embodiment according to the present invention.

Please refer to FIG. 2, which is a diagram of an image processing system 200 of an embodiment according to the present invention. As shown in FIG. 2, the image processing system 200 includes a receiving module 210, an ITU656 interface 220, and an image processing module 230. The receiving module 210 includes an image decoding unit 211, a VBI data decoding unit 212, a data converting unit 213, and a multiplexing unit 214. The image processing module 230 includes a data dispatcher 231, an image processing unit 232, a data converting unit 233, and an image mixing unit 234. The image processing unit 232 includes an image de-interlacing unit 235 and an image scaling unit 236. The data converting unit 233 includes a converting unit 237 and a storage unit 238. Please note that, the electrical connections among the components are shown in FIG. 2, and thus omitted here. Furthermore, the function and operation of each component in the image processing system 200 is illustrated as follows.

First, the image decoding unit 211 receives a TV signal (composite signal), and decodes the TV signal. As mentioned previously, the image decoding unit 211 can performs a sequence of steps (such as Y/C separation) on the fields carried by the TV signal to generate RGB signals corresponding to the fields. On the other hand, the VBI data decoding unit 212 decodes the VBI data (it means the data is carried in the VBI of the TV signal) to generate VBI image data, which is to be displayed. Please note that the VBI image data are also RGB signals.

Please note that the present invention does not directly mix the decoded VBI image data with the decoded field. As shown in FIG. 2, the image mixing unit 234 is set up in the image processing module 230. In other words, the present invention 232 first performs some image process on the fields and then mixes the VBI image data with the processed field. Therefore, the present invention can prevent the VBI image data from being incorrectly processed, and the entire image quality can be raised.

In addition, as mentioned previously, the fields and the VBI image data are both transferred through RGB signals. However, the data amount of the RGB signals is huge (for example, the each of R, G, and B information of each pixel needs 8 bits to represent), and the ITU656 interface 220 is limited to its bandwidth. Therefore, the bandwidth of the ITU656 interface 220 is not enough to directly carry the decoded VBI image data.

In order to solve the problem, in this embodiment, the data converting unit 213 converts the VBI image data into color index data to reduce the needed bandwidth of data transmission. For example, the close caption is not colorful, and the close caption often corresponds to a specific color (such as white). So only a few colors is needed to describe the close caption.

Therefore, for each pixel of the VBI image data, only one bit is needed (for example, the bit 0 represents the background color, and the bit 1 represents the specific color) to describe the entire close caption. Please note that the above-mentioned bit can be utilized as a color index. In other words, the data converting unit 213 converts each pixel data of the VBI image data into the color index data.

After the data converting unit 223 converts the VBI image data (close caption) into color index data, the data originally corresponding to 24 bits can be converted into a color index having only one bit. Therefore, the equivalent data transmission bandwidth of the VBI image data can be reduced. Besides, in order to comply with the transmission specification of the ITU656 interface 220, the present invention defines a protocol to transfer the color index data.

In this embodiment, the data converting unit 223 not only converts the VBI image data into color index data, but also packetizes the color index data such that VBI instruction packets, having color index data, can be generated. Please note that, the structure and related operations of the VBI instruction packets will be illustrated in the following disclosure.

In general, the decoded field decoded by the image decoding unit 221 is transferred through the ITU656 interface 220 in the rising edges of a control clock. However, in this embodiment, in order to efficiently utilize the bandwidth of the ITU656 interface 220, the VBI instruction packet is transmitted during the falling edges of the control clock. The above-mentioned multiplexing unit 214 is utilized to perform the aforementioned function. In other words, the multiplexing unit 214 outputs the pixel data of the fields to the ITU656 interface 220 during the rising edges, and outputs the VBI instruction packet to the ITU656 interface 220 during the falling edges. Here, please note, the operations of data transmissions will be illustrated with the structures of the VBI instruction packets, and thus omitted here.

Figure 3:
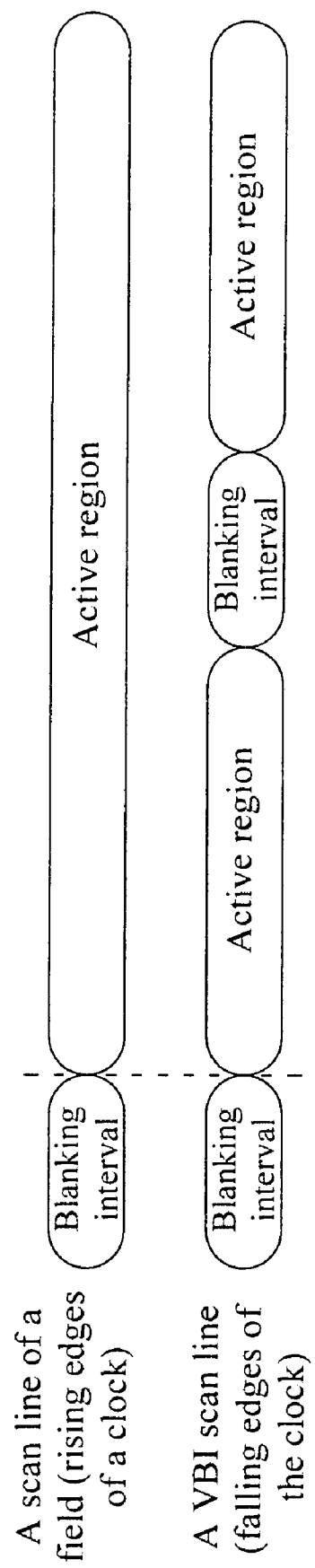
FIG. 3 is a diagram showing the data transmission according to the present invention.

In the following disclosure, the operations of data transmission will be illustrated. Please refer to FIG. 3, which is a diagram showing the data transmission according to the present invention. As shown in FIG. 3, the signal HSYNC is utilized to define the starting point and ending point of each scan line. As mentioned previously, the VBI data corresponds to progressive image data, and the fields correspond to interlaced image data. Therefore, in the ITU656 interface 220, the time period for transmitting one scan line of a field can be utilized to transmit two scan lines of the VBI image data.

However, the above-mentioned data transmission timing order is only regarded as an embodiment, not a limitation of the present invention. For example, the present invention can transmit more scan lines of the VBI image data when one scan line of the field is being transmitted.

Figure 4:
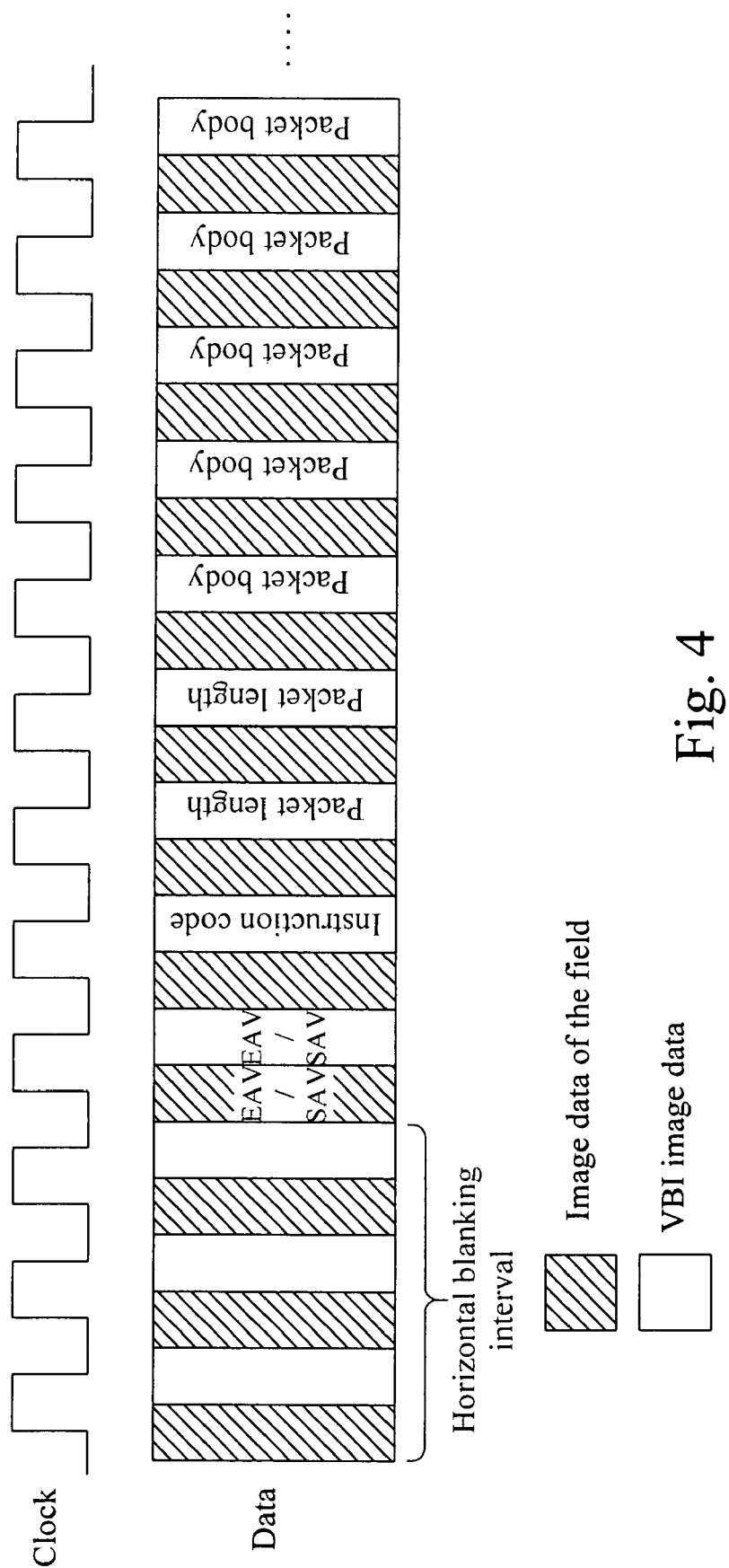
FIG. 4 is a diagram of data transmission through the ITU656 interface.

In addition, please refer to FIG. 4, which is a diagram of data transmission through the ITU656 interface 220. As shown in FIG. 4, the clock Clock is the control clock utilized in the ITU656 interface, and the data Data is divided into two parts including the image data of the field and the VBI instruction packets. Please note, because the data transmission of the image data of the field is well-known by those skilled in the art, is the detailed description is omitted here. For example, the image data of the field is transmitted between the instruction code SAV (meaning that the active region starts) and the instruction code EAV (meaning that the active region finishes).

As mentioned previously, in order to efficiently utilize the bandwidth of the ITU656 interface, the VBI instruction packets are transmitted during the falling edges of the clock. Furthermore, in the embodiment, VBI instruction packets are also transmitted between the instruction codes SAV and EAV, and one bit of the VBI instruction packet can be transmitted on each rising/falling edge of the clock. Thus, the entire VBI instruction packets can be transmitted to the following image processing module 230.

Please refer to FIG. 5, which illustrates the rules of the VBI instruction packets according to the present invention. As shown in FIG. 5, the first byte of the VBI instruction packet is a packet instruction code for indicating the packet type. For example, the instruction code 0-0000001b represents that the instruction packet is a VBI pixel instruction packet, meaning that the VBI instruction packet is utilized to transmit the related information of the pixel data of the VBI image data (such as the above-mentioned color index data). The second and the third bytes are utilized to indicate the packet length. The packets after the third packet correspond to a packet body, which carries the major information of the VBI instruction packet (such as the above-mentioned color index data).

Please note that, the VBI instruction packet shown in FIG. 5 is regarded as an embodiment, not a limitation to the present invention. Those skilled in the art could define other kinds of protocol to make the VBI data transmission possible. For example, more instruction codes can be utilized to transmit more VBI information, or more bytes can be utilized to transmit the packet length and the packet body. These changes also obey the spirit of the present invention.

Then, the image processing module 230 receives the image data of the field and the above-mentioned VBI instruction packet from the ITU656 interface. In this embodiment, the data dispatcher 231 unpacketize the VBI instruction packets to obtain the color index data inside the VBI instruction packets, and transfers the color index data to the data converting unit 233.

In this embodiment, the storage unit 238 includes the color table 239, which stores the mapping relationships between the color index data and the RGB values of the corresponding VBI image data. Therefore, the converting unit 237 can look up the color table 239 according to the received color index data, and then convert the color index data back into the original VBI image data decoded by the VBI data decoding 212.

On the other hand, the data dispatcher 231 transmits the image data of the fields to the image processing unit 232. The image processing unit 232 can perform following image process on the image data of the fields. For example, the image de-interlacing unit 235 can de-interlace the image data of the fields to generate progressive image data. Moreover, the scaling unit 236 can perform a scaling operation on the image data of the field to generate needed image data.

At last, image mixing unit 234 mixes the VBI image data with the de-interfaced image data to generate the image to be displayed. And the mixed image is sent to a display (not shown) to be displayed.

As mentioned previously, because the image mixing unit 234 mixes the processed image data with the VBI image data, the VBI image data is not incorrectly processed (e.g. processed through an incorrectly de-interlacing operation) such that the VBI image quality can be improved. In addition, because the VBI image data is transmitted as the color index data, the needed data transmission bandwidth is reduced. Therefore, the present invention can still use the originally-embedded ITU656 interface 220 to transfer all the image data (including the fields and the color index data corresponding to the VBI image data).

Please note, the implementation of the present invention is not limited to the color tables 239. For example, the color tables 239 can be previously stored inside the storage unit 238. Or, when the data converting unit 233 converts the VBI image data into the color index data, the color table 239 is additionally generated, meaning that the color table 239 can be transmitted to the image processing module 230 through the above-mentioned VBI instruction packets, and thus the inner data dispatcher 231 unpacketizes the VBI instruction packets to obtain the color table 239, and stores the color tables 239 into the storage unit 238. These changes also obey the spirit of the present invention.

Furthermore, the above-mentioned image data of the fields and the VBI image data are both RGB signals. However, the above-mentioned descriptions are regarded as simply embodiments, not limitations to the scope of the present invention. For example, other kinds of the image signal, such as YUV, YCrCb signals, can also be utilized. This change also obeys the spirit of the present invention.

The present invention image processing system and related image processing method can not only ensure the image quality of the VBI image, but also utilize the originally-embedded ITU656 interface to transfer all the image data. In other words, on the basis of not adding too many components, the present invention can improve the quality of the image.

While certain exemplary embodiments have been described and shown in the accompanying drawings, it is to be understood that such embodiments are merely illustrative of and not restrictive on the broad invention, and that this invention should not be limited to the specific construction and arrangement shown and described, since various other modifications may occur to those ordinarily skilled in the art.

What is claimed is:

1. An image processing system comprising:
   a receiving module, for receiving a composite signal carrying a first display data and a vertical blanking interval (VBI) data, the receiving module comprising:
   a video decoding unit, for decoding the first display data to generate a first image data;
   a VBI data decoding unit, for decoding the VBI data to generate a VBI image data; and
   a first converting unit, coupled to the VBI decoding unit, for converting the VBI image data into a color index data;
   a transmission interface, coupled to the receiving module, for transmitting the first image data and the color index data; and
   an image processing module, coupled to the transmission interface, the image processing module comprising:
   an image processing unit, for receiving the first image data to generate a second image data;
   a second converting unit, for receiving the color index data and generating the VBI image data according to the color index data; and
   an image mixing unit, coupled to the image processing unit and the second converting unit, for mixing the second image data and the VBI image data to generate a second display data.

2. The image processing system of claim 1, wherein the transmission interface transmits the first image data during a first transient of a clock, and transmits the color index data during a second transient of the clock.

3. The image processing system of claim 2, wherein the first transient is a rising edge, and the second transient is a falling edge.

4. The image processing system of claim 2, wherein the receiving module further comprises:
   a multiplexing unit, for receiving the first image data from the image decoding unit, and receiving the color index data from the first converting unit to output the first image data to the transmission interface during the first transient, and to output the color index data to the transmission interface during the second transient.

5. The image processing system of claim 1, wherein the image processing module further comprises:
   a data dispatcher, for receiving the first image data and the color index data from the transmission interface to output the first image data to the image processing unit, and to output the color index data to the second converting unit.

6. The image processing system of claim 1, wherein the first image data is an interlaced image data, and the image processing unit comprises:
   a video de-interlacing unit, for de-interlacing the first image data to generate the second image data.

7. The image processing system of claim 1, wherein the image processing unit comprises:
   a scaling unit, for performing a scaling operation on the first image data to generate the second image data.

8. The image processing system of claim 1, wherein the second converting unit comprises:
   a storage unit, for storing a color table, the color table storing mapping relationships between the VBI image data and the color index data; and
   a converting unit, coupled to the storage unit, for converting the color index data into the VBI image data according to the color index data and the color table.

9. The image processing system of claim 8, wherein the first converting unit is further utilized for generating the color table, and the transmission interface is utilized for transmitting the color table.

10. The image processing system of claim 1, wherein the transmission interface is an ITU656 interface.

11. The image processing system of claim 1, wherein the first image data and the VBI image data are both RGB data.

12. The image processing system of claim 1, wherein the composite signal is a TV signal.

13. An image processing method comprising:
   receiving a composite signal carrying a first display data and a vertical blanking interval (VBI) data;
   decoding the first display data to generate a first image data;
   decoding the VBI data to generate a VBI image data;
   performing a predetermined operation on the first image data to generate a second image data;

mixing the second image data and the VBI image data to generate a second display data;
providing a transmission interface;
converting the VBI image data into a color index data, and transmitting the color index data and the first image data by utilizing the transmission interface; and
receiving the color index data and the first image data from the transmission interface, and converting the color index data into the VBI image data.

14. The image processing method of claim 13, wherein the first display data and the first image data are both interlaced data, and the predetermined operation is a de-interlaced operation.

15. The image processing method of claim 13, wherein the predetermined operation is an image scaling operation.

16. The image processing method of claim 13, further comprising:
utilizing the transmission interface to transmit the first image data during a first transient of a clock; and
utilizing the transmission interface to transmit the color index data during a second transient of the clock.

17. The image processing method of claim 16, wherein the first transient is a rising edge, and the second transient is a falling edge.

18. The image processing method of claim 13, wherein the transmission interface is an ITU656 interface.

19. The image processing method of claim 13, further comprising:
looking up a color table to converting the color index data back into the VBI image data;
wherein the color table stores the corresponding relationships between the color index data and the VBI image data.

20. The image processing method of claim 13, wherein the first image data and the VBI image data are both RGB data.

21. The image processing method of claim 13, wherein the composite signal is a TV signal.

* * * * *